March 19, 1968 W. G. LIVEZEY ETAL 3,373,636
VEHICLE TRANSMISSION INCLUDING STEERING BY DRIVING
Filed Sept. 27, 1965 3 Sheets-Sheet 2

INVENTORS
William G. Livezey,
Robert M. Tuck &
Marion D. Smith

ATTORNEY

INVENTORS
William G. Livezey,
Robert M. Tuck &
Marion D. Smith

ATTORNEY

United States Patent Office 3,373,636
Patented Mar. 19, 1968

3,373,636
VEHICLE TRANSMISSION INCLUDING STEERING BY DRIVING
William G. Livezey, Robert M. Tuck, and Marion D. Smith, Indianapolis, Ind., assignors to General Motors Corporation, Detroit, Mich., a corporation of Delaware
Filed Sept. 27, 1965, Ser. No. 490,570
26 Claims. (Cl. 74—720.5)

ABSTRACT OF THE DISCLOSURE

A single input, dual output, vehicle power train having an input driven hydrostatic unit controlling a differential gear unit which is cooperable with a multiple speed ratio gear unit to provide single and dual input drive to a pair of output differential gear units for straight vehicle drive and to provide single and dual input differential drive to the output differential gear units for steering.

This invention relates to power trains and more particularly to a single input, dual output power train providing multiple speed range and hydrostatic steering operation.

In track-laying vehicles, it is advantageous to have a power train capable of providing multiple speed range operation for matching the prime mover to the vehicle and also steering for different turn radii to enable a high degree of maneuverability. Where steering is accomplished by engagement of a friction device and it is desired to negotiate a turn of greater radius than the fixed minimum turn radius, the friction device must be slipped. During the slippage period, the steering system is torque sensitive and the vehicle controllability thus becomes dependent on the variable track forces required for steering. Since the required track forces are largely dependent on vehicle speed, design and load, this torque sensitive type of steering restricts vehicle design and usage.

The principle of this invention lies in a hydrostatically controlled differential gear unit married to a single input, dual output power train for selectively providing a pair of equal speed, unidirectional drives for straight, forward and reverse drive ranges and a pair of infinitely variable, differential speed drives for steering.

The invention is illustrated in one embodiment in a power train having a torque converter and a multiple speed ratio gear unit connecting a prime mover to a pair of differential steer gear units which steer units are for driving the vehicle's propelling devices. The hydrostatically controlled differential gear unit has dual ring gear input from a selective forward and reverse input drive to the multiple speed ratio gear unit and separate carrier output drive to each steer unit. The pair of differential sun gears mesh with meshing differential pinions carried on a grounded carrier in addition to meshing with their pinions carried on their respective output carrier which pinions mesh with their respective ring gears. One of the differential sun gears is connected to the motor of a hydrostatic unit whose pump is driven by the prime mover. The hydrostatic unit is controllable to either hold the connected differential sun gear to provide equal speed, unidirectional drives to the steer units for straight, forward and reverse drive in all drive ranges or to drive the connected differential sun gear in either direction dependent on the direction of turn desired to provide infinitely variable and differential speed drives to the steer units for steering in all drive ranges and infinitely variable and equal speed, opposite directional drives for steering in neutral. Steer brakes for braking the differential carrier output drives to the steer units are also provided to afford a backup steering system.

An object of this invention is to provide a new and improved single input, dual output power train offering multiple speed range and hydrostatic steering operation.

Another object of this invention is to provide in a single input, dual output power train, a controlled differential gear unit for providing a pair of equal speed, unidirectional drives to the outputs, a pair of infinitely variable and differential speed drives to the outputs and a pair of infinitely variable and equal speed, opposite directional drives to the outputs.

Another object of this invention is to provide in a power train, a hydrostatically controlled differential gear unit for cooperating with a multiple speed ratio gear unit to provide single and dual input drive to a pair of output differential gear units for straight drive and to provide single and dual input differential drive to the output differential gear units for steering.

Another object of this invention is to provide in a single input, dual output power train, a multispeed gear unit for effecting a power path from the input to the pair of outputs to provide a plurality of different drive ranges and a hydrostatically controlled differential drive for providing opposite directional drives to the outputs in neutral for steering and for providing differential speed drives to the outputs in the different drive ranges for steering.

Another object of this invention is to provide a power train having an input with dual power paths to each of a pair of outputs, one power path being common to each output and having a selectively conditionable forward and reverse drive to a multiple speed ratio gear unit for power delivery to both outputs and the remaining power paths having the forward and reverse drive and including an input driven hydrostatic unit controlling a differential gear unit to provide equal speed, unidirectional drives for straight, forward and reverse drive ranges, to provide infinitely variable and differential speed drives for steering in the different drive ranges and to provide infinitely variable and equal speed, opposite directional drives for steering in neutral.

These and other objects of the invention will be more apparent from the following description and drawing of the preferred embodiments of the invention in which.

Figures 1, 2:
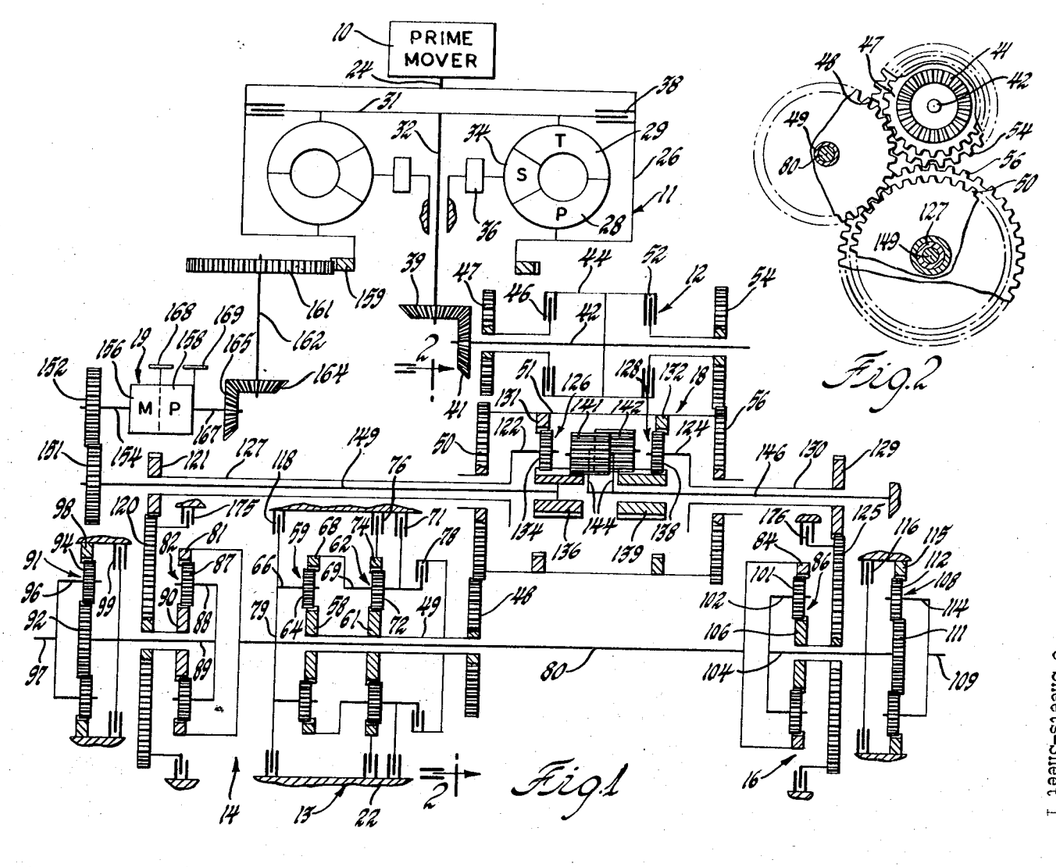
FIGURE 1 diagrammatically shows a power train constructed according to this invention.
FIGURE 2 is a view taken substantially on the line 2—2 in FIGURE 1.

Referring first to FIGURE 1, the invention is illustrated in one embodiment in a track-laying vehicle power train having a prime mover 10 which may be assumed as being a piston engine, a hydrodynamic torque converter 11, a forward and reverse drive unit 12, a three speed planetary gear unit 13, a left steer unit 14, a right steer unit 16, a differential gear unit 18 and a hydrostatic pump and motor unit 19 for controlling differential unit 18. The longitudinal central axes of prime mover 10 and converter 11 are arranged to be longitudinal of the vehicle to provide what is referred to as a T input drive for the power train which has the longitudinal central axes of units 12, 13, 14, 16 and 19 arranged to be transverse of the vehicle. A barrel housing 22 houses both the steer units 14 and 16 and the range unit 13 which units are coaxially located to provide what may be best described as a single barrel configuration for the units thus enclosed.

Describing these components and their power train connections in detail, prime mover 10 has an output shaft 24 connected by a converter housing 26 to pump blading 28, the converter housing being rotatably supported on suitable bearings and providing a rotatable converter housing for the remaining converter blading. The pump blading 28 exits to turbine blading 29 which is connected by a hub 31 to a turbine or converter output shaft 32. Fluid is circulated toroidally in the torque converter and, as it leaves the turbine blading, it is redirected to the pump blading 28 by stator blading 34 which stator blading is grounded for reaction by a one-way brake 36. The converter, being a three element converter of conventional design, provides torque multiplication in the conventional manner.

A converter lockup clutch 38 is provided which clutch when actuated by any suitable known control means is effective to provide a direct mechanical drive between shaft 24 and shaft 32 to bypass the hydraulic path of the torque converter.

The converter output shaft 32 provides input to the range unit 13 and also to the differential unit 18 via the forward and reverse drive unit 12, the range unit 13 providing one input to each steer unit and the differential gear unit 18 providing another input to each steer unit.

Converter output shaft 32 is connected to drive a bevel gear 39 meshing with a second bevel gear 41 which second gear is connected to drive a shaft 42 at right angles to shaft 32. Shaft 42 provides the input to clutch drum 44 of the forward and reverse drive unit 12. Drum 44 is connectible through forward and reverse drives to the range unit 13 and differential unit 18. For the forward drive to units 13 and 18, unit 12 has a forward drive clutch 46 which, when engaged, connects drum 44 to drive an annular spur gear 47 through which shaft 42 freely extends. As shown in FIGURE 2, gear 47 meshes with an annular spur gear 48 connected to drive a sleeve shaft 49 which shaft connects directly into the range unit 13. Gear 48 also meshes with an annular spur gear 50 which is connected to drive drum 51 of the differential gear unit 18 described in detail later. Gears 47 and 50 do not mesh. Thus, in the forward drive gear train provided and with the forward drive establishing clutch 46 engaged, shaft 42 drives the range unit input shaft 49 in the opposite direction and the differential gear unit input drum 51 in the same direction.

For reverse drive to the units 13 and 18, a reverse drive clutch 52 in unit 12 is engaged to connect drum 44 to an annular spur gear 54 which meshes with a second annular spur gear 56 as shown in FIGURES 1 and 2. Gear 56 is connected by the differential drum 51 to the gear 50 meshing with gear 48 to complete the drive to the range unit input shaft 49. Thus, connected gears 56 and 50 act as a reverse idler to cause gear 48 to rotate in the same direction as driving gear 54 so that with the reverse drive establishing clutch 52 engaged, shaft 42 drives the range unit input shaft 49 in the same direction and the differential gear unit input drum 51 in the opposite direction.

Describing the range unit components, the range unit input shaft 49 is connected to drive the sun gear 58 of a low planetary gear set 59 and also the sun gear 61 of an intermediate planetary gear set 62. The sun gear 58 meshes with pinions 64 journaled on an output planet carrier 66. Ring gear 68 meshes with pinions 64 and is connected to an intermediate carrier 69 which may be held by a low brake 71 to provide a low ratio drive between shaft 49 and the range unit output carrier 66. The sun gear 61 meshes with pinions 72 journaled on carrier 69. A ring gear 74 meshes with pinions 72 and may be held by an intermediate brake 76 to provide a higher speed and intermediate ratio drive to output carrier 66. A high clutch 78, when engaged, connects input shaft 49 to intermediate carrier 69 and connected low ring gear 68 to lock up the low gear set 59 to provide a direct drive between shaft 49 and the output carrier 66.

The range unit output carrier 66 is connected by a hub 79 to drive the steer units' input shaft 80 which extends freely through sleeve shaft 49. Shaft 80 is connected at its left end to the ring gear 81 of a planetary gear set 82 in left steer unit 14 and at its right end to the ring gear 84 of a planetary gear set 86 in right steer unit 16, gear sets 82 and 86 having equal speed ratios and a common axis.

On the left side, the left steer ring gear 81 meshes with pinions 87 journaled on an output carrier 88 which carrier is connected to drive the left steer unit output shaft 89. An annular steer sun gear 90 freely received on output shaft 89 meshes with pinions 87 and is connected to be controlled by the differential gear unit 18 as described in detail later. The power train is further provided with an integral left final speed reduction drive planetary gear set 91 which has its sun gear 92 driven by shaft 89. Sun gear 92 meshes with pinions 94 journaled on a carrier 96 which carrier is connected by a left final drive output shaft 97 to one of the vehicle propelling devices which, in the case of track-laying vehicles, would be the left track sprocket. A ring gear 98 which meshes with pinions 94 is grounded to the housing 22 to always provide reaction for this gear set for its low reduction drive. A left vehicle brake 99 is also provided for braking shaft 89 and thus shaft 97.

On the right side, the right steer ring gear 84 meshes with pinions 101 journaled on a carrier 102 which carrier is connected to drive the right steer unit output shaft 104. Annular steer sun gear 106 which freely receives shaft 104 meshes with pinions 101 and is connected to be driven by the hydrostatically controlled differential gear unit 18 as described in detail later. The integral right final speed reduction drive planetary gear set 108, which has a speed ratio equal to its complementary left gear set 91, completes the drive from the shaft 104 to a right final drive output shaft 109 for powering the right track sprocket and has its sun gear 111 driven by shaft 104. The sun gear 111 meshes with pinions 112 journaled on an output planet carrier 114 connected to shaft 109. A ring gear 115 meshes with pinions 112 and is grounded to the transmission housing to provide reaction for this gear set. A right vehicle brake 116 is provided to brake the shaft 104 and thus shaft 109.

A low low brake 118 is located between the left steer gear set 82 and the low gear set 59 and, when engaged, is connected by the hub 79 to hold shaft 80 and connected steer ring gears 81 and 84 so that the steer sun gears can, acting alone, produce drive in the left and right steer units as described later.

Describing now the hydrostatically controlled differential gear unit 18, the steer sun gears 90 and 106 are continuously connected by equal speed ratio and direction reversing gear trains to the output carriers 122 and 124 of equal speed ratio planetary gear sets 126 and 128, in unit 18. The left gear train comprises an annular spur gear 120 connected to sun gear 90 and meshing with a second spur gear 121 which latter gear is connected by a sleeve half shaft 127 to the left output carrier 122. The right gear train similarly comprises an annular spur gear 125 connected to sun gear 106 and meshing with a second spur gear 129 which latter gear is connected by a sleeve half shaft 130 to the right carrier 124. The ring gear 131 and 132 of gear set 126 and 128 respectively is connected to the drum 51 driven by the forward and reverse drive unit 12. Pinions 134 journaled on left output carrier 122 mesh with the ring gear 131 and a left sun gear 136. Similarly, pinions 138 are journaled on the right output carrier 124 and mesh with the ring gear 132 and an annular spun gear 139. The sun gears 136 and 139 also mesh with meshing differential pinions 141 and 142 respectively. The differential pinions 141 and 142 are rotatably supported on spindles attached to a differential carrier 144 which is grounded by a shaft 146 which freely extends through annular sun gear 139 to be connected to the housing.

Hydrostatic control of differential gear unit 18 is provided by the hydrostatic unit 19 operating on sun gear 136 which gear is connected for this purpose by a shaft 149 to a spur gear 151, shaft 149 extending through sleeve shaft 127. Spur gear 151 meshes with a second spur gear 152 which latter gear is connected to the shaft 154 of the hydrostatic motor 156 of unit 19, motor 156 being hydraulically connected to hydrostatic pump 158. The hydrostatic pump 158 is input driven with the converter by the prime mover through a gear train which has a spur gear 159 driven by the converter housing 26 and meshing with a second spur gear 161. Gear 161 is connected by a shaft 162 to drive a bevel gear 164 which bevel gear meshes with a second bevel gear 165 to drive the input shaft 167 of hydrostatic pump 158. The hydrostatic unit 19 may be of the form disclosed in copending application Ser. No. 279,372 filed May 10, 1963, now Patent No. 3,273,344, of Howard W. Christenson et al. with the pump 158 having a variable displacement and the motor 156 having a fixed displacement. Unit 19 has a control valve in the hydraulic circuit between the pump and motor manually operated by a handle 168, whereby the output motor shaft 154 may be free to rotate and may also be selectively driven in opposite directions at infinitely variable speeds or held, the speed and holding of output shaft 154 being controlled by a pump displacement control mechanism manually operated by a handle 169 while the control valve is conditioned for fluid communication between the pump and motor. It will be recognized that with the variable displacement pump 158, the output speed of the motor 156 from zero to a given speed is obtained with constant power output on increasing the displacement of the pump.

The other various brakes and clutches employed in this power train are conventional friction engaging devices and may be actuated in any known way, i.e. electrically, hydraulically, pneumatically or by some mechanical provision and in a certain sequence. The preferred sequence of operation is described in the following illustrative operational summary.

The power train may be operated to provide four speeds in forward and reverse and hydrostatically controlled steering. The first or low low forward drive range which is considered the lowest drive range and provides the greatest torque multiplication is obtained by engaging the forward drive clutch 46 and the low low brake 118 and conditioning the hydrostatic unit 19 to hold motor output shaft 154 and thus the sun gear 136 in differential gear unit 18, all other drive establishing devices being disengaged. Since the carrier 144 is grounded and the sun gear 136 is held by the hydrostatic unit, rotation of the other sun gear 139 is also prevented. With the ring gears 131 and 132 being driven at the same speed and in the same direction, the differential carriers 122 and 124 are driven in the same direction at the same speed by locked drives. Thus, the steer sun gears 90 and 106 are driven in the same direction which is forward and at the same speed while the steer ring gears 81 and 84 are held by the low low brake 118. Therefore, the steer gear sets 82 and 86 act as reduction gear sets with the locked input drives thus provided to drive their respective output shafts 89 and 104. Shafts 89 and 104 then drive the final drive output shafts 97 and 109 through the final drive gear sets 91 and 108 respectively. Gear sets 91 and 108 thus produce the maximum torque in the power train at the final drive output shafts only to reduce the torque load on the remainder of the power train.

In the differential gear unit 18, since the sun gears 136 and 139 have the same pitch diameter and the differential carrier 144 is held, positive rotation of sun gear 136 in either direction with the infinitely variable speed drive provided must result in equal and opposite rotation of sun gear 139. Thus, the output carriers 122 and 124 and their gear train connected steer sun gears 90 and 106 will be driven at equal differential speeds measured from their same base speed with sun gear 136 held since the carrier speeds are determined by the combination of the equal speed ratio drive to the connected ring gears 131 and 132 and the differential drives to the sun gears 136 and 139.

Thus, for steering in the first or low low forward drive range, the displacement control 169 of the hydrostatic unit 19 is operated so that the hydrostatic motor 156, instead of continuing to hold the sun gear 136, is then caused to drive the controlled sun gear 136 in either direction depending on the direction of turn described. Then, with sun gear 136 rotating in one direction, the sun gear 139 is caused to rotate in the opposite direction at the same speed whereby the combined differential action in the gear sets 126 and 128 causes, as for example, when sun gear 136 is driven in the same direction as the ring gears 131 and 132, the carrier 122 to speed up by the same amount that the speed of the carrier 124 is being diminished. This is because the rotation of sun gear 136 will add to the contribution of ring gear 131 while the opposite rotation of sun gear 139 will subtract the same amount from the ring gear 132. In this manner the steer sun gears 90 and 106 are differentially driven in the same direction or in opposite directions with locked differential drives recognizing that the left steer sun gear 90, for example, will be speeded up by the same amount that the speed of the opposite right steer sun gear 106 is diminished to thereby establish the differential steering. The steering radius is thus put under positive control and made infinitely variable by units 18 and 19 from straight ahead drive in low low down to the minimum radius possible with the gearing provided.

The three higher forward drive ranges are obtained by driving the two connected steer ring gears 81 and 84 forward at different speeds with the forward clutch 46 remaining engaged, holding sun gear 136 of unit 18 by the hydrostatic unit 19 and on selective conditioning of the range unit 13 to provide the low ratio drive (low brake 71 engaged), intermediate ratio drive (intermediate brake 76 engaged) and high ratio drive (high clutch 78 engaged) in that order. In these three higher operating ranges, the steer units then act as power combining and speed differential gear sets receiving power from the range unit 13 through their steer ring gear and from the differential gear unit 18 through their steer sun gear. Hydrostatically controlled differential steering is available in these higher ranges by control of the hydrostatic unit 19 to provide locked differential drive as described in the first or low low forward drive range, recognizing that the speed added to one of the steer sun gears will be equal to the speed subtracted from the opposite steer sun gear while the connected steer ring gears continue to rotate forwardly with their range unit 13 input drive. Thus, the output speed in one steer gear set is increased by the amount the output speed of the opposite steer gear set is diminished to provide the differential steering. Again, the steer radius is under positive control and infinitely variable in the second, third and fourth forward drive ranges from straight ahead down to the minimum radius possible with the gearing provided and assuming that the power train has sufficient power capacity to execute the desired maneuver, the required track forces are not a factor of controllability in the hydrostatically controlled differential steering system provided. Thus, the restrictions on vehicle design and usage are therefore eliminated.

Recognizing that the forward and reverse drive unit 12 provides the input to range unit 13 and differential gear unit 18, the same drive ranges and hydrostatically controlled differential steering provided in forward as described above are also available in reverse by simply disengaging the forward drive clutch 46, engaging the reverse drive clutch 52 and operating units 13 and 19 as before.

For neutral, both the forward and reverse drive clutches 46 and 52 are disengaged, the sun gear 136 of unit 18 is held by unit 19 and there is no output drive to shafts 97 and 109. Steering in neutral is provided by controlling the hydrostatic unit 19 to drive the sun gear 136 in either direction dependent on the direction of turn desired. This causes sun gear 139 to rotate in the opposite direction and since the drum 51 is acted on by opposed gear forces, the connected ring gears 131 and 132, though free, provide reaction in their gear sets. Thus, the output carriers 122 and 124 are caused to rotate at equal speeds and in opposite directions. Because the steer sun gears 90 and 106 are being driven in opposite directions and at the same speed by the free differential drives provided by unit 18, the connected steer ring gears 81 and 84, though free, provide reaction resulting in the shafts 97 and 109 being driven at equal speeds in opposite directions to produce pivot steering.

A backup steering system to back up the hydrostatically controlled system is made available by a left steer brake 175 provided to brake the spur gear 120 and connected left differential carrier 122 and left steer sun gear 90 and a right steer brake 176 provided to brake the spur gear 125 and connected right differential carrier 124 and right steer sun gear 106. This backup system is available to operate when the sun gear 136 in differential gear unit 18 is left free to rotate for any reason.

The backup system provides the same four speed forward and reverse ranges found in the hydrostatic steer system and differs in these drives only in that the differential drive of the steer sun gears by unit 18 is not locked during straight, forward and reverse drive since the previously controlled differential sun gear 136 is not held but instead is free to rotate. For steering in the first drive range in either forward or reverse, one of the steer brakes 175 or 176 is engaged, selection being dependent on the direction of turn desired, to brake the associated differential output carrier and connected steer sun gear on that side with the result that the differential gear unit 18 speeds up the opposite differential output carrier and connected steer sun gear by the same amount to produce what is described as brake differential steering with the connected steer ring gears held. The minimum radius turn occurs when the engaged steer brake is not permitted to slip and wider turns are produced by slipping the steer brake.

In the second, third and fourth drive range and in either forward or reverse, the drive in these ranges is again the combination of range unit 13 drive to the steer ring gears and the free differential drive of unit 18 to the steer sun gears. Nonslipping engagement of one steer brake subtracts the whole steer sun gear portion of the drive on that side and doubles the steer sun gear drive on the other side by operation of the differential gear unit 18 to provide a minimum radius turn while slipping of the engaged steer brake provides for wider turns. Under these conditions, the steering provided is of the differential type with the differential ratio reducing with range upshifting since proportioning of the steer sun gear drive to the total drive is reduced.

For neutral with the free differential which has both sun gear 136 and 139 in unit 18 free to rotate, the forward clutch 46 or the reverse clutch 52 is engaged, all other drive establishing devices being disengaged and there is no drive to the final drive output shafts. Then for steering, the engagement of one of the steer brakes 175 or 176 brakes the connected differential output carrier and steer sun gear causing the opposite differential output carrier and steer sun gear to double their speed. Since the steer gear sets can be considered as a differential combination with equivalent outputs or carriers and connected or common ring gears, with one input steer sun gear braked and the other input steer sun gear driven, it will be recognized that the carrier outputs of the steer gear sets will be driven at equal speeds but in opposite directions and the steering thus produced in neutral is the pivot type.

Figure 3:
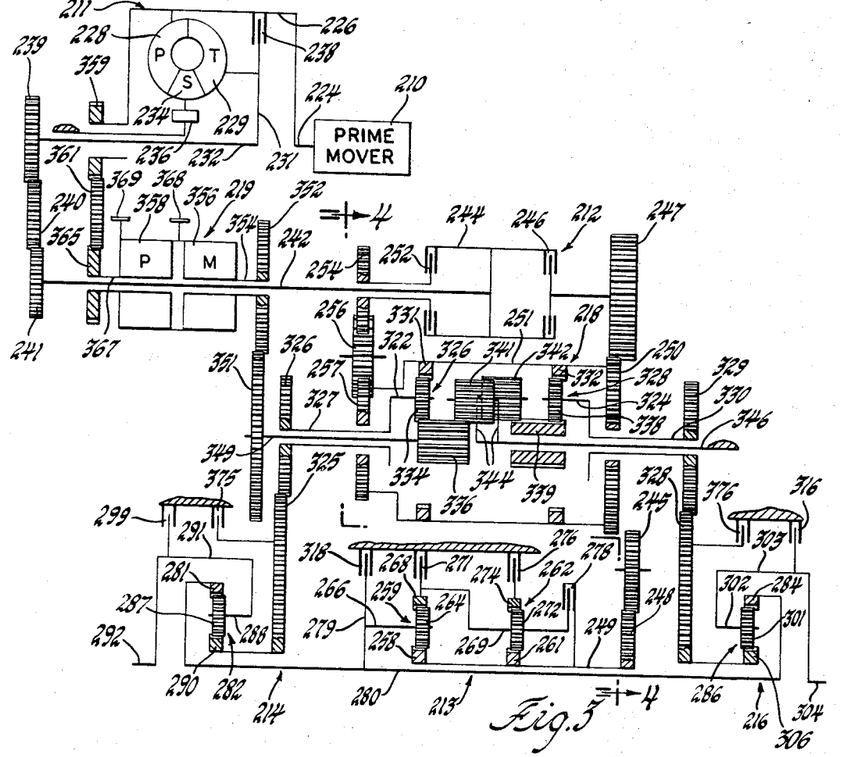
FIGURE 3 diagramatically shows another embodiment of the power train.
Figure 4:
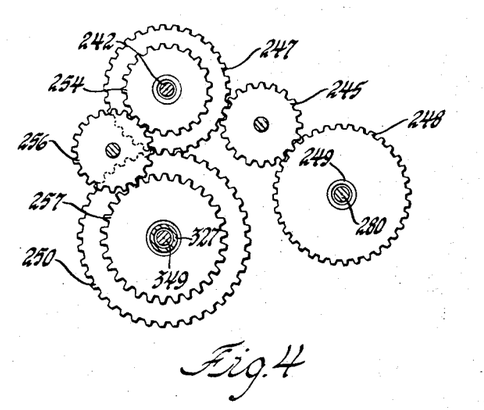
FIGURE 4 is a view taken substantially on the line 4—4 in FIGURE 3.

Another embodiment of our power train is illustrated in FIGURES 3 and 4 and in this instance has transverse input with the prime mover 210 which may be assumed as being a piston engine, and the torque converter 211 arranged to have their central axes located transverse of the vehicle. The forward and reverse drive unit 212, range unit 213, left steer unit 214, right steer unit 216, differential gear unit 218 and hydrostatic unit 219 complete the power train and have their central axes again arranged for location transverse of the vehicle.

Prime mover 210 has an output shaft 224 connected by converter housing 226 to pump blading 228. The pump blading 228 exits to turbine blading 229 which is connected by hub 231 to turbine or converter output shaft 232. Fluid is redirected to the pump blading 228 by stator blading 234 which stator blading is grounded for reaction by one-way brake 236. A converter locking up clutch 238 is provided which clutch when actuated is effective to provide a direct mechanical drive between shaft 224 and shaft 232.

The converter output shaft 232 provides input to the range unit 213 and also to the differential unit 218 via the forward and reverse drive unit 212, the range unit 213 providing one input to each steer unit and the differential gear unit 218 providing another input to each steer unit.

Converter output shaft 232 is connected to drive a spur gear 239 meshing with an idler gear 240. Gear 240 meshes with a gear 241 which latter gear is connected to drive a shaft 242 parallel to shaft 232. Shaft 242 provides the input to the clutch drum 244 of the forward and reverse drive unit 212. Drum 244 in turn is connectible through forward and reverse drives to the range unit 213 and differential unit 218. For the forward drive to units 213 and 218, unit 212 has a forward drive clutch 246 which, when engaged, connects drum 244 to drive a spur gear 247. As shown in FIGURE 4, gear 247 meshes with an idler spur gear 245 which latter gear meshes with a spur gear 248 connected to drive a sleeve shaft 249. Shaft 249 connects directly into the range unit 213. Gear 247 also meshes with an annular spur gear 250 which is connected to drive the drum 251 of the differential gear unit 218 described in detail later. Thus, in the forward drive gear train provided and with the forward drive establishing clutch 246 engaged, shaft 242 drives the range unit input shaft 249 in the same direction and the differential gear unit input drum 251 in the opposite direction.

For reverse drive to the units 213 and 218, a reverse drive clutch 252 in unit 212 is engaged to connect drum 244 to an annular spur gear 254 received on shaft 242 which gear meshes with an idler spur gear 256. Gear 256 meshes with an annular spur gear 257 connected by the differential drum 251 to the gear 250 meshing with gear 247 which latter gear then delivers the drive via meshing gears 245 and 248 to the range unit input shaft 249. Thus, with the reverse drive establishing clutch 252 engaged, shaft 242 drives the range unit input shaft 249 in the opposite direction and the differential gear unit input drum 251 in the same direction.

Describing the range unit components, the range unit input shaft 249 is connected to drive the sun gear 258 of a low planetary gear set 259 and also the sun gear 261 of an intermediate planetary gear set 262. The sun gear 258 meshes with pinions 264 journaled on an output planet carrier 266. Ring gear 268 meshes with pinions 264, is connected to the intermediate carrier 269 and may be held by a low brake 271 to provide a low ratio drive to the range unit output carrier 266. The sun gear 261 meshes with pinions 272 journaled on carrier 269. A ring gear 274 meshes with pinions 272 and may be held by an intermediate brake 276 to provide a higher speed and intermediate ratio drive to output carrier 266. A high clutch 278, when engaged, connects input shaft 249 to intermediate carrier 269 and connected low ring gear 268 to lock up the low gear set 259 to provide direct drive.

The range unit output carrier 266 is connected by a hub 279 to drive the steer units' input shaft 280 which extends freely through sleeve shaft 249. Shaft 280 is connected at its left end to the ring gear 281 of a planetary gear set 282 in left steer unit 214 and at its right end to the ring gear 284 of a planetary gear set 286 in right steer unit 216, gear sets 282 and 286 having equal speed ratios.

On the left side, the left steer ring gear 281 meshes with pinions 287 journaled on an output carrier 288. An annular steer sun gear 290 freely received on shaft 280 meshes with pinions 287 and is connected to be controlled by the differential gear unit 218 as described in detail later. A drum 291 connects carrier 288 to the left output shaft 292 which shaft may be connected to the left track sprocket by a vehicle mounted reduction gear unit. A left vehicle brake 299 is also provided for braking drum 291 and thus shaft 292.

On the right side, the right steer ring gear 284 meshes with pinions 301 journaled on a carrier 302 which carrier is connected by drum 303 to drive the right steer unit output shaft 304 for powering the right track sprocket. Annular steer sun gear 306 which freely receives shaft 280 meshes with pinions 301 and is connected to be driven by the hydrostatically controlled differential gear unit 218 as described in detail later. A right vehicle brake 316 is provided to brake the drum 303 and thus shaft 304.

A low low brake 318 is located between the left steer gear set 282 and the low gear set 259 and, when engaged, is connected by the hub 279 to hold shaft 280 and connected steer ring gears 281 and 284 so that the steer sun gears can, acting alone, produce drive in the left and right steer units.

Describing now the hydrostatically controlled differential gear unit 218, the steer sun gears 290 and 306 are continuously connected by equal speed ratio and direction reversing gear trains to the output carriers 322 and 324 of equal speed ratio planetary gear sets 326 and 328 in unit 218. The left gear train comprises a spur gear 325 connected to sun gear 290 and meshing with a second spur gear 326 which latter gear is connected by a sleeve half shaft 327 to the left output carrier 322. The right gear train similarly comprises a spur gear 328 connected to sun gear 306 and meshing with a second spur gear 329 which latter gear is connected by a sleeve half shaft 330 to the right carrier 324. The ring gear 331 and 332 of gear sets 326 and 328 respectively is connected to the drum 251 driven by the forward and reverse drive unit 212. Pinions 334 journaled on the left output carrier 322 mesh with the ring gear 331 and left sun gear 336. Similarly, pinions 338 are journaled on the right output carrier 324 and mesh with the ring gear 332 and an annular sun gear 339. The sun gear 336 and 339 also meshes with meshing differential pinions 341 and 342 respectively. The differential pinions 341 and 342 are rotatably supported on spindles attached to a differential carrier 344 which is grounded by a shaft 346 which freely extends through annular sun gear 339 to be connected to the housing.

Hydrostatic control of differential gear unit 218 is provided by the hydrostatic unit 219 operating on sun gear 336 which gear is connected by a shaft 349 to a spur gear 351, shaft 349 extending through sleeve shaft 327. Spur gear 351 meshes with a second spur gear 352 which latter gear is connected to the sleeve shaft 354 of the hydrostatic motor 356 of unit 219, motor 356 being hydraulically connected to hydrostatic pump 358. The hydrostatic pump 358 is input driven by the prime mover through a gear train which has a spur gear 359 driven by the converter housing 226 and meshing with a second spur gear 361. Gear 361 meshes with a third spur gear 365 to drive the input sleeve shaft 367 of hydrostatic pump 358. The shaft 242 for unit 212 extends freely through sleeve shafts 367 and 354 of unit 219. The hydrostatic unit 219 is of the form described in FIGURE 1 with the pump 358 having a variable displacement and the motor 356 having a fixed displacement. Unit 219 has a control valve in the hydraulic circuit between the pump and motor manually operated by handle 368, whereby the output shaft 354 may be free to rotate and may also be selectively driven in opposite directions at infinitely variable speeds or held, the speed and holding of output shaft 354 being controlled by a pump displacement control mechanism manually operated by a handle 369.

A backup steering system is again made available by a left steer brake 375 for braking the left differential carrier 322 and left steer sun gear 290 and a right steer brake 376 for braking the right differential carrier 324 and right steer sun gear 306.

The FIGURE 3 power train is operable to function like the FIGURE 1 power train described previously.

Figure 5:
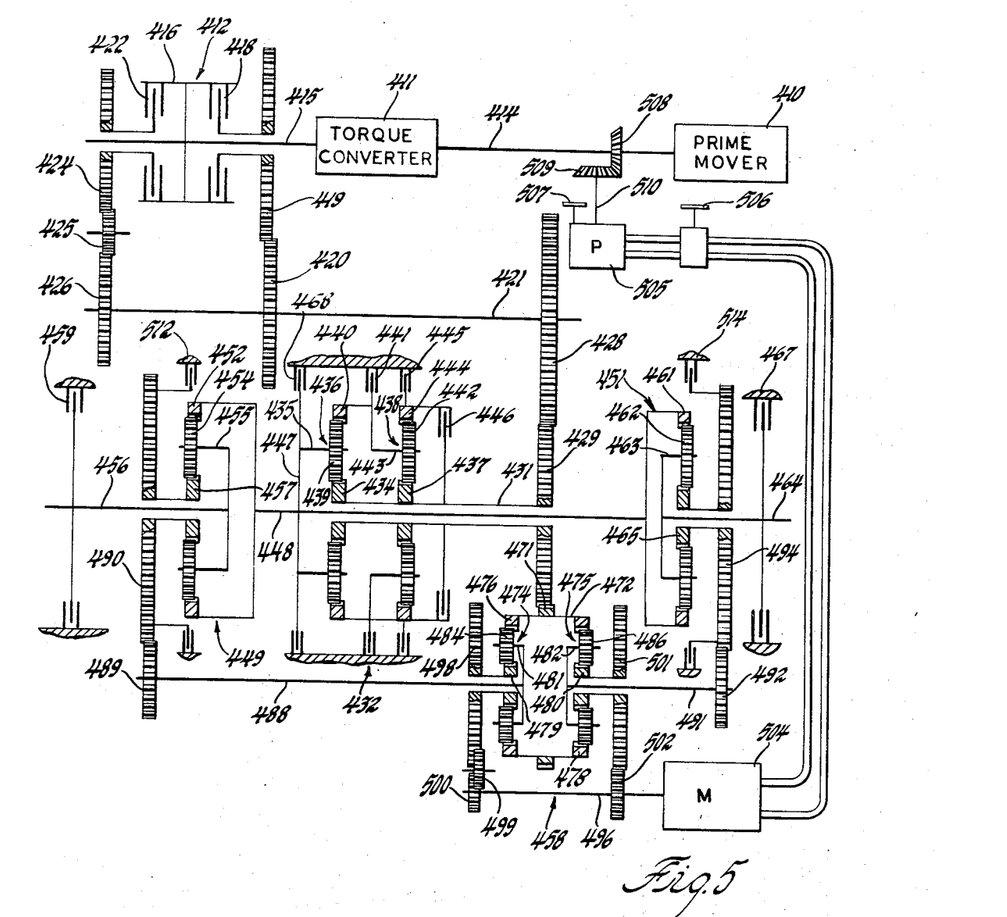
FIGURE 5 diagrammatically shows another embodiment of the power train.
Figure 6:
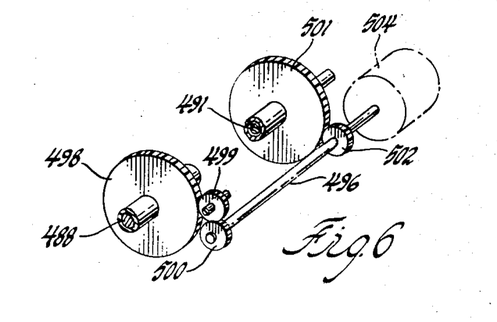
FIGURE 6 is a perspective view of a portion of FIGURE 5.

Another embodiment of our invention in which multiple speed range operation in forward and reverse and hydrostatically controlled steering is available is illustrated in FIGURES 5 and 6. Again, there is provided transverse input like the FIGURE 3 embodiment with the prime mover 410 which may be assumed as being a piston engine, the torque converter 411 and in this instance the forward and reverse drive unit 412 having coaxially located central axes arranged to be transverse of the vehicle. The prime mover output shaft 414 connects the prime mover 410 to the torque converter 411 which torque converter has the same components as shown in the previous embodiments in FIGURES 1 and 3 and has its converter output shaft 415 directly connected to drive the clutch drum 416 of unit 412.

In unit 412, the forward drive clutch 418, when engaged, clutches the drum 416 to a two element gear train comprising meshing spur gears 419 and 420 to drive a countershaft 421 in one direction. A reverse clutch 422, when engaged, clutches drum 416 to drive a three element gear train comprising meshing spur gears 424, 425 and 426 to drive countershaft 421 in the opposite direction. A spur gear 428 connected to the right hand end of countershaft 421 meshes with a second spur gear 429 which latter gear is connected to drive the sleeve shaft 431 to provide input to the three speed range unit 432.

In the range unit, shaft 431 is connected to drive the sun gear 434 of the low planetary gear set 436 and also the sun gear 437 of the intermediate planetary gear set 438. The sun gear 434 meshes with the pinions 439 journaled on the output planet carrier 435. Ring gear 440 meshes with pinions 439 and may be held by engagement of the low brake 441 to provide the low ratio drive to output carrier 435. The sun gear 437 meshes with the pinions 442 journaled on the intermediate carrier 443 which is connected to the low ring gear 440. The ring gear 444 meshes with pinions 442 and is held on engagement of the intermediate brake 445 to provide the intermediate ratio drive to the output carrier 435. The high clutch 446, when engaged, connects the intermediate ring gear 444 to the input shaft 431 whereby the low gear set 436 is locked up to provide a direct mechanical drive to the output carrier 435. Output carrier 435 is connected by the hub 447 to the shaft 448 which extends through sleeve shaft 431 for connection to the left steer unit 449 and the right steer unit 451 which steer units have equal ratio planetary gear sets.

In the left steer gear set, the shaft 448 is connected at its left end to the left steer ring gear 452. The ring gear 452 meshes with pinions 454 journaled on the output carrier 455 which carrier is connected to drive the left output shaft 456. The left steer sun gear 457 meshes with pinions 454 and is connected to the hydrostatically controlled differential gear unit 458 which is described in detail later. The left vehicle brake 459 is provided for braking the left output shaft 456.

In the right steer unit 451 the shaft 448 is connected to the right steer ring gear 461. The pinions 462 mesh with the ring gear 461 and are journaled on the output carrier 463 which is connected to drive the right output shaft 464. The steer sun gear 465 meshes with pinions 462 and is connected to the hydrostatically controlled differential gear unit 458 as will be described in detail later. The right vehicle brake 467 is provided for braking the right output shaft 464.

Again, the low low brake 468 is located between the left steer unit 449 and integrated into the range unit 432 to brake the shaft 448 and connected steer ring gears 452 and 461.

Describing now the hydrostatically controlled differential gear unit 458, input to this unit is provided by the spur gear 471 which gear meshes with the range unit input gear 429 and is connected to drive a drum 472 in which is mounted a pair of equal ratio planetary gear sets 474 and 475 arranged back to back on a common axis. The gear sets 474 and 475 have respectively a ring gear 476 and 478 which ring gears are mounted on the drum 472, an annular sun gear 479 and 480 and a carrier 481 and 482. Pinions 484 journaled on the carrier 481 mesh with ring gear 476 and sun gear 479 and pinions 486 journaled on carrier 482 mesh with ring gear 478 and sun gear 480.

The differential output carriers 481 and 482 are connected by equal speed ratio gear trains to the left and right steer sun gears 457 and 465. The output carrier 481 is connected to the left steer sun gear 457 by a differential half shaft 488 extending through gear 457 which shaft is connected to drive a spur gear 489 meshing with a second spur gear 490, the latter gear being connected to drive the left steer sun gear 457. Similarly, the output carrier 482 on the right side is connected to drive the right half shaft 491 which is connected to drive a spur gear 492 meshing with a second spur gear 494 connected to drive the right steer sun gear 465.

Control of the differential gear unit 458 is obtained by connecting the sun gears 479 and 480 to the hydrostatically controlled shaft 496, these connections being effected by equal speed ratio gear trains which have opposite resultant drive directions. As best shown in FIGURE 6, the left differential sun gear 479 is connected to shaft 496 by a three element gear train which has the first spur gear 498 connected to sun gear 479. Gear 498 meshes with the second or reverse idler spur gear 499 which latter gear in turn meshes with the third spur gear 500 connected to shaft 496. The right differential sun gear 480 is connected to the shaft 496 by a two element gear train comprising the meshing spur gears 501 and 502. The hydrostatic unit has the same basic components as the FIGURE 1 embodiment and comprises the hydrostatic motor 504 which directly controls shaft 496 and is connected to the hydrostatic pump 505 by the hydraulic circuit including the control valve controlled by handle 506. The hydrostatic pump 505 whose displacement control mechanism is controlled by handle 507 is input driven and has a bevel gear 508 connected to prime mover shaft 414 which gear meshes with a second bevel gear 509 connected to pump input shaft 510.

Describing now the operation of the differential gear unit 458, when the shaft 496 is held by proper conditioning of the hydrostatic unit, the connected differential sun gears 479 and 480 are held. Then, with the ring gears 476 and 478 being driven in the same direction at the same speed, equal and locked speed ratio drives are provided to the differential half shafts 488 and 491. Alternatively, when shaft 496 is rotated in either direction by the hydrostatic unit, one of the differential sun gears 479 and 480 is turned in one direction and the other sun gear is turned in the opposite direction at the same speed. This relative rotation or differential speed of the sun gears biases the output speed of the differentially arranged gear sets 474 and 475 to slow the speed of one of the differential output carriers and connected steer sun gear and increase the speed of the other differential output carrier and connected steer sun gear by a like amount.

Thus, the embodiment of the power train shown in FIGURE 5 is operable to provide the same drive and steering operation as the FIGURE 1 and FIGURE 3 embodiments with the shaft 496 being held for straight drive in forward and reverse in the four drive ranges provided by selective engagement of low low brake 468, low brake 441, intermediate brake 445 and high clutch 446 while either the forward or reverse drive clutch 418 or 422 is engaged dependent on whether forward or reverse drive is desired.

Hydrostatically controlled differential steering by locked differential drives is again provided by rotating and controlling the speed of shaft 496 in either direction dependent on the direction of turn desired which shaft rotation controls the differential gear unit 458 by differential sun gears 479 and 480 to speed up one steer sun gear and slow down the speed of the other steer sun gear by a like amount in all drive ranges. In neutral, there is no drive through unit 412 and hydrostatically controlled rotation of shaft 496 again provides pivot steering.

Steer brakes are available to back up the hydrostatic steering, the left steer brake 512 being provided to brake the left steer sun gear 457 and left differential carrier 481 and the right steer brake 514 being connected to brake the right steer sun gear 465 and right differential carrier 482. Thus, the steer brake system operates the same as the FIGURE 1 and 3 embodiments.

The above described preferred embodiments are illustrative of the invention and may be modified within the scope of the appended claims.

We claim:
1. In a power train the combination of:
   (a) an input member, a pair of output members,
   (b) a speed differential gear unit operatively connected to each said output member operable to drive the connected output member with single input drive and also to drive the connected output member with dual input drive at a speed proportional to the speed difference of the dual input drive,
   (c) first power transmitting means for transmitting power from said input member to both said speed differential gear units to provide single input drive for both said speed differential gear units,
   (d) second power transmitting means including a multiple speed ratio gear unit for transmitting power from said input member to both said speed differential gear units and cooperating with said single input drive of said first power transmitting means to provide dual input drive for both said speed differential gear units,
   (e) and said first power transmitting means including means for effecting locked equal ratio, similar directional drives for said single input drives to said speed differential gear units and also for effecting an infinitely variable increasing speed drive to one of said speed differential gear units and an equivalent decreasing speed rate drive to the other of said speed differential gear units to produce a relative speed difference between said output members during the single input drive and also the duel input drive.

2. In a power train the combination of:
   (a) an input member, a pair of output members,
   (b) a speed differential gear unit operatively connected to each said ouput member operable to drive the connected output member with single input drive and also to drive the connected output member with dual input drive at a speed proportional to the speed difference of the dual input drive,
   (c) first power transmitting means for transmitting power from said input member to both said speed differential gear units to provide single input drive for both said speed differential gear units, (d) second power transmitting means including a multiple speed ratio gear unit for transmitting power from said input member to both said speed differential gear units and cooperating with said single input drive of said first power transmitting means to provide dual input drive for both said speed differential gear units, (e) and said first power transmitting means including hydrostatically controlled differential gear means for effecting hydrostatically controlled, locked, equal ratio, similar directional drives for said single input drives to said speed differential gear units and also for effecting hydrostatically controlled, infinitely variable speed, equal ratio, opposite directional drives to said speed differential gear units to produce a relative speed difference between said output members and also for effecting a hydrostatically controlled, infinitely variable increasing speed and locked drive to one of said speed differential gear units and an equivalent decreasing speed rate, locked drive to the other of said speed differential gear units to produce a relative speed difference between said output members.

3. In a power train the combination of:
(a) an input member, a pair of coaxially arranged output members,
(b) a speed differential gear unit operatively connected to each said output member operable to drive the connected output member with single input drive and also to drive the connected output member with dual input drive at a speed proportional to the speed difference of the dual input drive, each said speed differential gear unit having a sun gear member, a ring gear member and a carrier member having pinions meshing with said sun and ring gear, the gear member of one pair of corresponding gear members of said speed differential gear units connected to its associated output member,
(c) first power transmitting means for transmitting power from said input member to another pair of corresponding gear members of said speed differential units to provide single input drive for both said speed differential gear units,
(d) second power transmitting means including a multiple speed ratio gear unit for transmitting power from said input member to another pair of corresponding gear members of said speed differential gear units for cooperating with said single input drive of said first power transmitting means to provide dual input drive for both said speed differential gear units,
(e) and said first power transmitting means including hydrostatically controlled differential gear means for effecting locked, equal ratio, similar directional drives for said single input drives to said speed differential gear units and also for effecting an infinitely variable increasing speed, locked drive to one of said speed differential gear units and an equivalent decreasing speed rate, locked drive to the other of said speed differential gear units to produce a relative speed difference between said output members during the single input drive and also the dual input drive.

4. In a power train the combination of:
(a) an input member, a pair of output members,
(b) a speed differential gear unit operatively connected to each said output member operable to drive the connected output member with single input drive and also to drive the connected output member with dual input drive at a speed proportional to the speed difference of the dual input drive,
(c) first power transmitting means for transmitting power from said input member to both said speed differential gear units to provide single input drive for both said speed differential gear units,
(d) second power transmitting means including a multiple speed ratio gear unit for transmitting power from said input member to both said speed differential gear units and cooperating with said single input drive of said first power transmitting means to provide dual input drive for both said speed differential gear units,
(e) and said first power transmitting means including hydrostatically controlled differential gear means for effecting an infinitely variable increasing speed, locked drive to one of said speed differential gear units and an equivalent decreasing speed rate, locked drive to the other of said speed differential gear units to produce a relative speed difference between said output members during single input drive and also dual input drive, said hydrostatically controlled differential gear means comprising a first and a second differential planetary gear set having respectively a first and a second differential sun gear, a first and a second differential ring gear and a first and a second differential carrier having pinions meshing with said first and second differential sun and differential ring gear respectively, a grounded carrier having a first set of pinions meshing with said first differential sun gear and a second set of pinions meshing with said first set of pinions and said second differential sun gear, first drive means for drivingly connecting said input member to said first and second differential ring gear, second drive means for drivingly connecting said first differential carrier to one of said speed differential gear units, third drive means having a speed ratio drive equal to said second drive means for drivingly connecting said second differential carrier to the other of said speed differential gear units, hydrostatic means drivingly connected to said input member for selectively driving one of said differential sun gears in opposite directions at infinitely variable speeds and for holding said one differential sun gear.

5. The power train set forth in claim 4 and said hydrostatic means comprising a variable displacement hydrostatic pump drivingly connected to said input member, a hydrostatic motor drivingly connected to said hydrostatic pump and said one differential sun gear and control means operable to control said pump and motor to effect the aforementioned control of said one differential sun gear.

6. In a power train the combination of:
(a) an input member, a pair of output members,
(b) a speed differential gear unit operatively connected to each of said output members operable to drive the connected output member with single input drive and also to drive the connected output member with dual input drive at a speed proportional to the speed difference of the dual input drive,
(c) first power transmitting means for transmitting power from said input member to both said speed differential gear units to provide single input drive for both said speed differential gear units,
(d) second power transmitting means including a multiple speed ratio gear unit for transmitting power from said input member to both said speed differential gear units and cooperating with said single input drive of said first power transmitting means to provide dual input drive for both said speed differential gear units,
(e) and said first power transmitting means including hydrostatically controlled differential gear means for effecting an infinitely variable increasing speed, locked drive to one of said speed differential gear units and an equivalent decreasing speed rate, locked drive to the other of said speed differential gear units to produce a relative speed difference between said output members during the single input drive and also the dual input drive, said hydrostatically controlled differential gear means comprising a first and a second differential planetary gear set having respectively a first and a second differential sun gear, a first and a second differential ring gear and a first and a second differential carrier having pinions meshing with said first and second differential sun and differential ring gear respectively, drive means for drivingly connecting said differential sun gears to rotate in opposite directions at the same time, first drive means for drivingly connecting said input member to said first and second differential ring gear, second drive means for drivingly connecting said first differential carrier to one of said speed differential gear units, third drive means having a speed ratio drive equal to said second drive means for drivingly connecting said second differential carrier to the other of said speed differential gear units, hydrostatic means drivingly connected to said input member for selectively driving one of said differential sun gears in opposite directions at infinitely variable speeds and for holding said one differential sun gear.

7. The power train set forth in claim 6 and said hydrostatic means comprising a variable displacement hydrostatic pump drivingly connected to said input member, a hydrostatic motor drivingly connected to said hydrostatic pump and said one differential sun gear and control means operable to control said pump and motor to effect the aforementioned control of said one differential sun gear.

8. In a power train the combination of:
(a) an input member,
(b) a left and a right planetary steer gear set having respectively a left and a right steer sun gear, a left and a right steer ring gear and a left and a right output carrier having pinions meshing with said left and right sun and ring gear respectively, means connecting said left and right steer ring gear,
(c) first power transmitting means for transmitting power from said input member to said steer ring gears including a multiple ratio gear unit conditionable to provide a plurality of speed ratio drives,
(d) and second power transmitting means for transmitting power from said input member to said left and right steer sun gear including differential gear means comprising a left and a right differential planetary gear set having respectively a left and a right differential sun gear, a left and a right differential ring gear and a left and a right differential carrier having pinions meshing with said left and right differential sun and differential ring gear respectively, a grounded carrier having a first set of pinions meshings with said left differential sun gear and a second set of pinions meshing with said first set of pinions and said right differential sun gear, first drive means for drivingly connecting said input member to said first and second differential ring gear, second drive means for drivingly connecting said left differential carrier to said left steer sun gear, third drive means having a speed ratio drive equal to said second drive means for drivingly connecting said right differential carrier to said right steer sun gear, variable ratio drive means for drivingly connecting said input member to one of said differential sun gears.

9. The power train set forth in claim 8 and said variable ratio drive means including hydrostatic means for selectively driving said one differential sun gear in opposite directions at infinitely variable speeds and for holding said one differential sun gear.

10. The power train set forth in claim 8 and a brake for braking each said steer sun gear and connected differential carrier.

11. In a power train the combination of:
(a) an input member,
(b) a left and a right planetary steer gear set having respectively a left and a right steer sun gear, a left and a right steer ring gear and a left and a right output carrier having pinions meshing with said left and right sun and ring gear respectively, means connecting said left and right steer ring gear, a brake for holding said steer ring gears,
(c) first power transmitting means for transmitting power from said input member to said steer ring gears including a multiple ratio gear unit conditionable to provide a plurality of speed ratio drives,
(d) second power transmitting means for transmitting power from said input member to said left and right steer sun gear including hydrostatically controlled differential gear means comprising a left and a right differential planetary gear set having respectively a left and a right differential sun gear, a left and a right differential ring gear and a left and a right differential carrier having pinions meshing with said left and right differential sun and differential ring gear respectively, a grounded carrier having a first set of pinions meshing with said left differential sun gear and a second set of pinions meshing with said first set of pinions and said right differential sun gear, first drive means for drivingly connecting said input member to said first and second differential ring gear, second drive means for drivingly connecting said left differential carrier to said left steer sun gear, third drive means having a speed ratio drive equal to said second drive means for drivingly connecting said right differential carrier to said right steer sun gear, hydrostatic means drivingly connected to said input member for selectively driving one of said differential sun gears in opposite directions at infinitely variable speeds and for holding said one differential sun gear,
(e) the combination of said left and right planetary steer gear set and said first and second power transmitting means being operable to provide a neutral condition in which no power is transmitted to said output carriers when said one differential sun gear is held and said steer ring gears are free to rotate and to provide the same, locked, speed ratio, directional drive to said left and right output carrier in a plurality of drive ranges when said one differential sun gear is held and on selective braking of said steer ring gears and conditioning of said multiple ratio gear unit,
(f) and the combination of said left and right planetary steer gear set and said first and second power transmitting means being operable to provide hydrostatically controlled steering in all of said drive ranges and neutral when said hydrostatic means is controlled to selectively drive said one differential sun gear in opposite directions.

12. In a power train the combination of:
(a) an input member,
(b) a left and a right planetary steer gear set having respectively a left and a right steer sun gear, a left and a right steer ring gear and a left and a right output carrier having pinions meshing with said left and right sun and ring gear respectively, means connecting said left and right steer ring gear, said steer gear sets having a common axis, a low low brake for holding said steer ring gears,
(c) first power transmitting means for transmitting power from said input member to said steer ring gears including a multiple ratio gear unit concentrically arranged about said axis and comprising a first and a second planetary gear set having respectively a first and a second sun gear, a first and a second ring gear and a first and a second carrier having pinions meshing with said first and second sun and ring gear respectively, first drive means for drivingly connecting said input member to said first and second sun gear, said first carrier connected to said steer ring gears, a low brake to brake said first ring gear to provide a low speed ratio drive to said steer ring gears, said second carrier connected to said first ring gear, an intermediate brake to brake said second ring gear to provide an intermediate speed ratio drive to said steer ring gears and a high clutch to lock up said first gear set to provide a high speed ratio, direct drive to said steer ring gears, (d) second power transmitting means for transmitting power from said input member to said left and right steer sun gear including hydrostatically controlled differential gear means comprising a left and a right differential planetary gear set having respectively a left and a right differential sun gear, a left and a right differential ring gear and a left and a right differential carrier having pinions meshing with said left and right differential sun and differential ring gear respectively, a grounded carrier having a first set of pinions meshing with said left differential sun gear and a second set of pinions meshing with said first set of pinions and said right differential sun gear, second drive means for drivingly connecting said input member to said first and second differential ring gear, third drive means for drivingly connecting said left differential carrier to said left steer sun gear, fourth drive means having a speed ratio drive equal to said third drive means for drivingly connecting said right differential carrier to said right steer sun gear, hydrostatic means drivingly connected to said input member for selectively driving one of said differential sun gears in opposite directions at infinitely variable speeds and for holding said one differential sun gear, (e) the combination of said left and right planetary steer gear set and said first and second power transmitting means being operable to provide a neutral transmission condition in which no power is transmitted to said output carriers when said one differential sun gear is held and said steer ring gears are free to rotate and to provide the same, locked, speed ratio, directional drive to said left and right output carrier in a low, low, low, intermediate and high drive range when said one differential sun gear is held and on selective engagement of said low, low brake, said low brake, said intermediate brake and said high clutch respectively.

(f) and the combination of said left and right planetary steer gear set and said first and second power transmitting means being operable to provide hydrostatically controlled steering in all of said drive ranges and neutral when said hydrostatic means is controlled to selectively drive said one differential sun gear in opposite directions.

13. In a power train the combination of:
(a) an input member,
(b) a left and a right planetary steer gear set having respectively a left and a right steer sun gear, a left and a right steer ring gear and a left and a right output carrier having pinions meshing with said left and right sun and ring gear respectively, means connecting said left and right steer ring gear, said steer gear sets having a common axis, a low low brake for holding said steer ring gears,
(c) first power transmitting means for transmitting power from said input member to said steer ring gears including a multiple ratio gear unit concentrically arranged about said axis and comprising a first and a second planetary gear set having respectively a first and a second sun gear, a first and a second ring gear and a first and a second carrier having pinions meshing with said first and second sun and ring gear respectively, first drive means for drivingly connecting said input member to said first and second sun gear, said first carrier connected to said steer ring gears, a low brake to brake said first ring gear to provide a low speed ratio drive to said steer ring gears, said second carrier connected to said first ring gear, an intermediate brake to brake said second ring gear to provide an intermediate speed ratio drive to said steer ring gears and a high clutch to lock up said first gear set to provide a high speed ratio, direct drive to said steer ring gears, (d) second power transmitting means for transmitting power from said input member to said left and right steer sun gear including hydrostatically controlled differential gear means comprising a left and a right differential planetary gear set having respectively a left and a right differential sun gear, a left and a right differential ring gear and a left and a right differential carrier having pinions meshing with said left and right differential sun and differential ring gear respectively, a grounded carrier having a first set of pinions meshing with said left differential sun gear and a second set of pinions meshing with said first set of pinions and said right differential sun gear, second drive means for drivingly connecting said input member to said first and second differential ring gear, third drive means for drivingly connecting said left differential carrier to said left steer sun gear, fourth drive means having a speed ratio drive equal to said third drive means for connecting said right differential carrier to said right steer sun gear, hydrostatic means for selectively driving one of said differential sun gears in opposite directions at infinitely variable speeds and for holding said one differential sun gear and comprising a variable displacement hydrostatic pump drivingly connected to said input member, a hydrostatic motor drivingly connected to said hydrostatic pump and said one differential sun gear and control means operable to control said pump and motor to effect the aforementioned control of said one differential sun gear, (e) the combination of said left and right planetary steer gear set and said first and second power transmitting means being operable to provide a neutral transmission condition in which no power is transmitted to said output carriers when said one differential sun gear is held and said steer ring gears are free to rotate and to provide the same, locked, speed ratio, directional drive to said left and right output carrier in a low low, low, intermediate and high drive range when said one differential sun gear is held and on selective engagement of said low low brake, said low brake, said intermediate brake and said high clutch respectively, (f) and the combination of said left and right planetary steer gear set and said first and second power transmitting means being operable to provide hydrostatically controlled steering in all of said drive ranges and neutral when said hydrostatic means is controlled to selectively drive said one differential sun gear in opposite directions.

14. In a power train the combination of
(a) a hydrodynamic torque converter having a pump, a turbine and a stator,
(b) a left and a right planetary steer gear set having respectively a left and a right steer sun gear, a left and a right steer ring gear and a left and a right output carrier having pinions meshing with said left and right sun and ring gear respectively, a shaft connecting said left and right steer ring gear, a low low brake for holding said shaft,
(c) first power transmitting means for transmitting power from said turbine to said shaft including a multiple ratio gear unit concentrically arranged about said shaft and comprising a first and a second planetary gear set having respectively a first and a second sun gear, a first and a second ring gear and a first and a second carrier having pinions meshing with said first and second sun and ring gear respectively, first drive means for drivingly connecting said turbine to said first and second sun gear, said first carrier connected to said shaft, a low brake to brake said first ring gear to provide a low speed ratio drive to said shaft, said second carrier connected to said first ring gear, an intermediate brake to brake said second ring gear to provide an intermediate speed ratio drive to said shaft and a high clutch to lock said first gear set to provide a high speed ratio, direct drive to said shaft, (d) second power transmitting means for transmitting power from said turbine to said left and right steer sun gear including hydrostatically controlled differential gear means comprising a left and a right differential planetary gear set having respectively a left and a right differential sun gear, a left and a right differential ring gear and a left and a right differential carrier having pinions meshing with said left and right differential sun and differential ring gear respectively, a grounded carrier having a first set of pinions meshing with said left differential sun gear and a second set of pinions meshing with said first set of pinions and said right differential sun gear, second drive means for drivingly connecting said turbine to said first and second differential ring gear, third drive means for drivingly connecting said left differential carrier to said left steer sun gear, fourth drive means having a speed ratio drive equal to said third drive means for drivingly connecting said right differential carrier to said right steer sun gear, hydrostatic means for selectively driving one of said differential sun gears in opposite directions at infinitely variable speeds and for holding said one differential sun gear and comprising a variable displacement hydrostatic pump drivingly connected to said torque converter pump, a hydrostatic motor drivingly connected to said hydrostatic pump and said one differential sun gear and control means operable to control said hydrostatic pump and motor to effect the aforementioned control of said one differential sun gear, (e) the combination of said left and right planetary steer gear set and said first and second power transmitting means being operable to provide a neutral transmission condition is which no power is transmitted to said output carriers when said one differential sun gear is held and said shaft is free to rotate and to provide the same, locked, speed ratio, directional drive to said left and right output carrier in a low low, low, intermediate and high drive range when said one differential sun gear is held and on selective engagement of said low low brake, said low brake, said intermediate brake and said high clutch respectively, (f) and the combination of said left and right planetary steer gear set and said first and second power transmitting means being operable to provide hydrostatically controlled steering in all of said drive ranges and neutral when said hydrostatic means is controlled to selectively drive said one differential sun gear in opposite directions.

15. In a power train the combination of:
(a) a hydrodynamic torque converter having a pump, a turbine and a stator,
(b) a left and a right planetary steer gear set having respectively a left and a right steer sun gear, a left and a right steer ring gear and a left and a right output carrier having pinions meshing with said left and right sun and ring gear respectively, a shaft connecting said left and right steer ring gear, a low low brake for holding said shaft,
(c) first power transmitting means for transmitting power from said turbine to said shaft including a multiple ratio gear unit concentrically arranged about said shaft and comprising a first and a second planetary gear set having respectively a first and a second sun gear, a first and a second ring gear and a first and a second carrier having pinions meshing with said first and second sun and ring gear respectively, first drive means including a forward drive power train operated by forward drive establishing means and a reverse drive power train operated by reverse drive establishing means for drivingly connecting said turbine to said first and second sun gear, said first carrier connected to said shaft, a low brake to brake said first ring gear to provide a low speed ratio drive to said shaft, said second carrier connected to said first ring gear, an intermediate brake to brake said second ring gear to provide an intermediate speed ratio drive to said shaft and a high clutch to lock up said first gear set to provide a high speed ratio, direct drive to said shaft, (d) second power transmitting means for transmitting power from said turbine to said left and right steer sun gear including hydrostatically controlled differential gear means comprising a left and a right differential planetary gear set having respectively a left and a right differential sun gear, a left and a right differential ring gear and a left and a right differential carrier having pinions meshing with said left and right differential sun and differential ring gear respectively, a grounded carrier having a first set of pinions meshing with said left differential sun gear and a second set of pinions meshing with said first set of pinions and said right differential sun gear, second drive means including said first drive means for drivingly connecting said turbine to said first and second differential ring gear, third drive means for drivingly connecting said left differential carrier to said left steer sun gear, fourth drive means having a speed ratio drive equal to said third drive means for drivingly connecting said right differential carrier to said right steer sun gear, hydrostatic means for selectively driving one of said differential sun gears in opposite directions at infinitely variable speeds and for holding said one differential sun gear and comprising a variable displacement hydrostatic pump drivingly connected to said torque converter pump, a hydrostatic motor drivingly connected to said hydrostatic pump and said one differential sun gear and control means operable to control said hydrostatic pump and motor to effect the aforementioned control of said one differential sun gear, (e) the combination of said left and right planetary steer gear set and said first and second power transmitting means being operable to provide a neutral transmission condition in which no power is transmitted to said output carriers when one of said power trains is operated, said one differential sun gear is held and said shaft is free to rotate and to provide the same, locked, speed ratio, directional drive to said left and right output carrier in a low low, low, intermediate and high drive range when one of said power trains is operated, said one differential sun gear is held and on selective engagement of said low low brake, said low brake, said intermediate brake and said high clutch respectively.

(f) and the combination of said left and right planetary steer gear set and said first and second power transmitting means being operable to provide hydrostatically controlled steering in all of said drive ranges and neutral when said hydrostatic means is controlled to selectively drive said one differential sun gear in opposite directions.

16. The power train set forth in claim 15 and said torque converter having an axis transverse to said shaft.

17. The power train set forth in claim 15 and said torque converter having an axis parallel to said shaft.

18. In a power train the combination of:
(a) an input member,
(b) a left and a right planetary steer gear set having respectively a left and a right steer sun gear, a left and a right steer ring gear and a left and a right output carrier having pinions meshing with said left and right sun and ring gear respectively, means connecting said left and right steer ring gears, (c) first power transmitting means for transmitting power from said input member to said steer ring gears including a multiple ratio gear unit conditionable to provide a plurality of speed ratio drives, (d) and second power transmitting means for transmitting power from said input member to said left and right steer sun gear including differential gear means comprising a left and a right differential planetary gear set having respectively a left and a right differential sun gear, a left and a right differential ring gear and a left and a right differential carrier having pinions meshing with said left and right differential sun and differential ring gear respectively, a grounded carrier having a pair of meshing pinions with one pinion meshing with said left differential sun gear and the other pinion meshing with said right differential sun gear, first drive means for drivingly connecting said input member to said first and second differential ring gear, second drive means for drivingly connecting said left differential carrier to said left steer sun gear, third drive means having a speed ratio drive equal to said second drive means for drivingly connecting said right differential carrier to said right steer sun gear, infinitely variable ratio drive means for drivingly connecting said input member to one of said differential sun gears.

19. The power train set forth in claim 18 and said infinitely variable ratio drive means including hydrostatic means for selectively driving said one differential sun gear in opposite directions at infinitely variable speeds and for holding said one differential sun gear.

20. The power train set forth in claim 18 and a brake for holding each said steer ring gear and connected differential carrier.

21. In a power train the combination of:
(a) an input member,
(b) a left and a right planetary steer gear set having respectively a left and a right steer sun gear, a left and a right steer ring gear and a left and a right output carrier having pinions meshing with said left and right sun and ring gear respectively, means connecting said left and right steer ring gears, a brake for holding said steer ring gears, (c) first power transmitting means for transmitting power from said input member to said steer ring gears including a multiple ratio gear unit conditionable to provide a plurality of speed ratio drives, (d) second power transmitting means for transmitting power from said input member to said left and right steer sun gear including hydrostatically controlled differential gear means comprising a left and a right differential planetary gear set having respectively a left and a right differential sun gear, a left and a right differential ring gear and a left and a right differential carrier having pinions meshing with said left and right differential sun and differential ring gear respectively, a grounded carrier having a pair of meshing pinions with one pinion meshing with said left differential sun gear and the other pinion meshing with said right differential sun gear, first drive means for drivingly connecting said input member to said first and second differential ring gear, second drive means for drivingly connecting said left differential carrier to said left steer sun gear, third drive means having a speed ratio drive equal to said second drive means for drivingly connecting said right differential carrier to said right steer sun gear, hydrostatic means drivingly connected to said input member for selectively driving one of said differential sun gears in opposite directions at infinitely variable speeds and for holding said one differential sun gear, (e) the combination of said left and right planetary steer gear set and said first and second power transmitting means being operable to provide a neutral transmission condition in which no power is transmitted to said output carriers when said one differential sun gear is held and said steer ring gears are free to rotate and to provide the same, locked, speed ratio, directional drive to said left and right output carrier in a plurality of drive ranges when said one differential sun gear is held and on selective braking of said steer ring gears and conditioning of said multiple ratio gear unit, (f) and the combination of said left and right planetary steer gear set and said first and second power transmitting means being operable to provide hydrostatically controlled steering in all of said drive ranges and neutral when said hydrostatic means is controlled to selectively drive said one differential sun gear in opposite directions.

22. In a power train the combination of:
(a) an input member,
(b) a left and a right planetary steer gear set having respectively a left and a right steer sun gear, a left and a right steer ring gear and a left and a right output carrier having pinions meshing with said left and right sun and ring gear respectively, means connecting said left and right steer ring gear, said steer gear sets having a common axis, a low low brake for holding said steer ring gears, (c) first power transmitting means for transmitting power from said input member to said steer ring gears including a multiple ratio gear unit concentrically arranged about said axis and comprising a first and a second planetary gear set having respectively a first and a second sun gear, a first and a second ring gear and a first and a second carrier having pinions meshing with said first and second sun and ring gear respectively, first drive means for drivingly connecting said input member to said first and second sun gear, said first carrier connected to said steer ring gears, a low brake to brake said first ring gear to provide a low speed ratio drive to said steer ring gears, said second carrier connected to said first ring gear, an intermediate brake to brake said second ring gear to provide an intermediate speed ratio drive to said steer ring gears and a high clutch to lock up said first gear set to provide a high speed ratio, direct drive to said steer ring gears, (d) second power transmitting means for transmitting power from said input member to said left and right steer sun gear including hydrostatically controlled differential gear means comprising a left and a right differential planetary gear set having respectively a left and a right differential sun gear, a left and a right differential ring gear and a left and a right differential carrier having pinions meshing with said left and right differential sun and differential ring gear respectively, a grounded carrier having a pair of meshing pinions with one pinion meshing with said left differential sun gear and the other pinion meshing with said right differential sun gear, second drive means for drivingly connecting said input member to said first and second differential ring gear, third drive means for drivingly connecting said left differential carrier to said left steer sun gear, fourth drive means having a speed ratio drive equal to said third drive means for drivingly connecting said right differential carrier to said right steer sun gear, hydrostatic means drivingly connected to said input member for selectively driving one of said differential sun gears in opposite directions at infinitely variable speeds and for holding said one differential sun gear, (e) the combination of said left and right planetary steer gear set and said first and second power transmitting means being operable to provide a neutral transmission condition in which no power is transmitted to said output carriers when said one differential sun gear is held and said steer ring gears are free to rotate and to provide the same, locked, speed ratio, directional drive to said left and right output carrier in a low low, low, intermediate and high drive range when said one differential sun gear is held and on selective engagement of said low low brake, said low brake, said intermediate brake and said high clutch respectively, (f) and the combination of said left and right planetary steer gear set and said first and second power transmitting means being operable to provide hydrostatically controlled steering in all of said drive ranges and neutral when said hydrostatic means is controlled to selectively drive said one differential sun gear in opposite directions.

23. In a power train the combination of:
(a) an input member,
(b) a left and a right planetary steer gear set having respectively a left and a right steer sun gear, a left and a right steer ring gear and a left and a right output carrier having pinions meshing with said left and right sun and ring gear respectively, means connecting said left and right steer ring gear, said steer gear sets having a common axis, a low low brake for holding said steer ring gears,
(c) first power transmitting means for transmitting power from said input member to said steer ring gears including a multiple ratio gear unit concentrically arranged about said axis and comprising a first and a second planetary gear set having respectively a first and a second sun gear, a first and a second ring gear and a first and a second carrier having pinions meshing with said first and second sun and ring gear respectively, first drive means for drivingly connecting said input member to said first and second sun gear, said first carrier connected to said steer ring gears, a low brake to brake said first ring gear to provide a low speed ratio drive to said steer ring gears, said second carrier connected to said first ring gear, an intermediate brake to brake said second ring gear to provide an intermediate speed ratio drive to said steer ring gears and a high clutch to lock up said first gear set to provide a high speed ratio, direct drive to said steer ring gears,
(d) second power transmitting means for transmitting power from said input member to said left and right steer sun gear including hydrostatically controlled differential gear means comprising a left and a right differential planetary gear set having respectively a left and a right differential sun gear, a left and a right differential ring gear and a left and a right differential carrier having pinions meshing with said left and right differential sun and differential ring gear respectively, a grounded carrier having a pair of meshing pinions with one pinion meshing with said left differential sun gear and the other pinion meshing with said right differential sun gear, second drive means for drivingly connecting said input member to said first and second differential ring gear, third drive means for drivingly connecting said left differential carrier to said left steer sun gear, fourth drive means having a speed ratio drive equal to said third drive means for drivingly connecting said right differential carrier to said right steer sun gear, hydrostatic means for selectively driving one of said differential sun gears in opposite directions at infinitely variable speeds for holding said one differential sun gear and comprising a variable displacement hydrostatic pump drivingly connected to said input member, a hydrostatic motor drivingly connected to said hydrostatic pump and said one differential sun gear and control means operable to control said pump and motor to effect the aforementioned control of said one differential sun gear,
(e) the combination of said left and right planetary steer gear set and said first and second power transmitting means being operable to provide a neutral transmission condition in which no power is transmitted to said output carriers when said one differential sun gear is held and said steer ring gears are free to rotate and to provide the same, locked, speed ratio, directional drive to said left and right output carrier in a low low, low, intermediate and high drive range when said one differential sun gear is held and on selective engagement of said low low brake, said low brake, said intermediate brake and said high clutch respectively, (f) and the combination of said left and right planetary steer gear set and said first and second power transmitting means being operable to provide hydrostatically controlled steering in all of said drive ranges and neutral when said hydrostatic means is controlled to selectively drive said one differential sun gear in opposite directions.

24. In a power train the combination of:
(a) a hydrodynamic torque converter having a pump, a turbine and a stator,
(b) a left and a right planetary steer gear set having respectively a left and a right steer sun gear, a left and a right steer ring gear and a left and a right output carrier having pinions meshing with said left and right sun and ring gear respectively, a shaft connecting said left and right steer ring gear, a low low brake for holding said shaft,
(c) first power transmitting means for transmitting power from said turbine to said shaft including a multiple ratio gear unit concentrically arranged about said shaft and comprising a first and a second planetary gear set having respectively a first and a second sun gear, a first and a second ring gear and a first and a second carrier having pinions meshing with said first and second sun and ring gear respectively, first drive means for drivingly connecting said turbine to said first and second sun gear, said first carrier connected to said shaft, a low brake to brake said first ring gear to provide a low speed ratio drive to said shaft, said second carrier connected to said first ring gear, an intermediate brake to brake said second ring gear to provide an intermediate speed ratio drive to said shaft and a high clutch to lock up said first gear set to provide a high speed ratio, direct drive to said shaft,
(d) second power transmitting means for transmitting power from said turbine to said left and right steer sun gear including hydrostatically controlled differential gear means comprising a left and a right differential planetary gear set having respectively a left and a right differential sun gear, a left and a right differential ring gear and a left and a right differential carrier having pinions meshing with said left and right differential sun and differential ring gear respectively, a grounded carrier having a pair of meshing pinions with one pinion meshing with said left differential sun gear and the other pinion meshing with said right differential sun gear, second drive means for drivingly connecting said turbine to said first and second differential ring gear, third drive means for drivingly connecting said left differential carrier to said left steer sun gear, fourth drive means having a speed ratio drive equal to said third drive means for drivingly connecting said right differential carrier to said right steer sun gear, hydrostatic means for selectively driving one of said differential sun gears in opposite directions at infinitely variable speeds and for holding said one differential sun gear and comprising a variable displacement hydrostatic pump drivingly connected to said torque converter pump, a hydrostatic motor drivingly connected to said hydrostatic pump and said one differential sun gear and control means operable to control said hydrostatic pump and motor to effect the aforementioned control of said one differential sun gear, (e) the combination of said left and right planetary steer gear set and said first and second power transmitting means being operable to provide a neutral transmission condition in which no power is transmitted to said output carriers when said one differential sun gear is held and said shaft is free to rotate and to provide the same, locked, speed ratio, directional drive to said left and right output carrier in a low low, low, intermediate and high drive range when said one differential sun gear is held and on selective engagement of said low low brake, said low brake, said intermediate brake and said high clutch respectively, (f) and the combination of said left and right planetary steer gear set and said first and second power transmitting means being operable to provide hydrostatically controlled steering in all of said drive ranges and neutral when said hydrostatic means is controlled to selectively drive said one differential sun gear in opposite directions.

25. In a power train the combination of:

(a) a hydrodynamic torque converter having a pump, a turbine and a stator, (b) a left and a right planetary steer gear set having respectively a left and a right steer sun gear, a left and a right steer ring gear and a left and a right output carrier having pinions meshing with said left and right sun and ring gear respectively, a shaft connecting said left and right steer ring gear, a low low brake for holding said shaft, (c) first power transmitting means for transmitting power from said turbine to said shaft including a multiple ratio gear unit concentrically arranged about said shaft and comprising a first and a second planetary gear set having respectively a first and a second sun gear, a first and a second ring gear and a first and a second carrier having pinions meshing with said first and second sun and ring gear respectively, first drive means including a forward drive power train operated by forward drive establishing means and a reverse drive power train operated by reverse drive establishing means for drivingly connecting said turbine to said first and second sun gear, said first carrier connected to said shaft, a low brake to brake said first ring gear to provide a low speed ratio drive to said shaft, said second carrier connected to said first ring gear, an intermediate brake to brake said second ring gear to provide an intermediate speed ratio drive to said shaft and a high clutch to lock up said first gear set to provide a high speed ratio, direct drive to said shaft, (d) second power transmitting means for transmitting power from said turbine to said left and right steer sun gear including hydrostatically controlled differential gear means comprising a left and a right differential planetary gear set having respectively a left and a right differential sun gear, a left and a right differential ring gear and a left and a right differential carrier having pinions meshing with said left and right differential sun and differential ring gear respectively, a grounded carrier having a pair of meshing pinions with one pinion meshing with said left differential sun gear and the other pinion meshing with said right differential sun gear, second drive means including said first drive means for drivingly connecting said turbine to said first and second differential ring gear, third drive means for drivingly connecting said left differential carrier to said left steer sun gear, fourth drive means having a speed ratio drive equal to said third drive means for drivingly connecting said right differential carrier to said right steer sun gear, hydrostatic means for selectively driving one of said differential sun gears in opposite directions at infinitely variable speeds and for holding said one differential sun gear and comprising a variable displacement hydrostatic pump drivingly connected to said torque converter pump, a hydrostatic motor drivingly connected to said hydrostatic pump and said one differential sun gear and control means operable to control said hydrostatic pump and motor to effect the aforementioned control of said one differential sun gear, (e) the combination of said left and right planetary steer gear set and said first and second power transmitting means being operable to provide a neutral transmission condition in which no power is transmitted to said output carriers when one of said power trains is operated, said one differential sun gear is held and said shaft is free to rotate and to provide the same, locked, speed ratio, directional drive to said left and right output carrier in a low low, low, intermediate and high drive range when one of said power trains is operated, said one differential sun gear is held and on selective engagement of said low low brake, said low brake, said intermediate brake and said high clutch respectively, (f) and the combination of said left and right planetary steer gear set and said first and second power transmitting means being operable to provide hydrostatically controlled steering in all of said drive ranges and neutral when said hydrostatic means is controlled to selectively drive said one differential sun gear in opposite directions.

26. The power train set forth in claim 25 and said torque converter having an axis parallel to said shaft.

References Cited

UNITED STATES PATENTS

| | | | |
|---|---|---|---|
| 1,247,725 | 11/1917 | Schneider | 74—720.5 X |
| 1,336,912 | 12/1943 | Zimmerman | 74—687 |
| 2,377,354 | 6/1945 | Merritt | 74—720.5 X |
| 2,391,735 | 12/1945 | Orshansky | 74—687 X |
| 2,689,488 | 9/1954 | Storer et al. | 74—710.5 |
| 2,689,489 | 9/1954 | Storer et al. | 74—710.5 |
| 2,930,257 | 3/1960 | Christenson | 74—720.5 |
| 3,199,376 | 8/1965 | De Lalio | 74—720.5 |

FOREIGN PATENTS

| | | |
|---|---|---|
| 907,690 | 7/1945 | France. |
| 1,174,182 | 7/1964 | Germany. |
| 573,528 | 11/1945 | Great Britain. |
| 798,840 | 7/1958 | Great Britain. |
| 891,675 | 3/1962 | Great Britain. |

ROBERT M. WALKER, *Primary Examiner.*

THOMAS C. PERRY, *Assistant Examiner.*

UNITED STATES PATENT OFFICE
CERTIFICATE OF CORRECTION

Patent No. 3,373,636                                             March 19, 1968

William G. Livezey et al.

It is certified that error appears in the above identified patent and that said Letters Patent are hereby corrected as shown below:

Column 2, line 62, "duel" should read -- dual --; line 67, "ouput" should read -- output --. Column 13, line 42, after "ential" insert -- gear --. Column 14, line 6, after "vide" insert -- dual input --. Column 19, line 40, "is" should read -- in --.

Signed and sealed this 29th day of July 1969.

(SEAL)
Attest:

Edward M. Fletcher, Jr.                            WILLIAM E. SCHUYLER, JR.
Attesting Officer                                            Commissioner of Patents